(12) United States Patent
Weindorf et al.

(10) Patent No.: US 8,567,610 B2
(45) Date of Patent: Oct. 29, 2013

(54) FUEL SUPPLY SYSTEM OF AN INTERNAL COMBUSTION ENGINE AND METHOD FOR SEPARATING WATER FROM FUEL

(75) Inventors: Martin Weindorf, Kornwestheim (DE); Marco Schweikart, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 45 days.

(21) Appl. No.: 13/253,736

(22) Filed: Oct. 5, 2011

(65) Prior Publication Data
US 2012/0080386 A1 Apr. 5, 2012

(30) Foreign Application Priority Data
Oct. 5, 2010 (DE) .................. 10 2010 047 354

(51) Int. Cl.
*F02M 37/22* (2006.01)

(52) U.S. Cl.
USPC ........ 210/416.4; 210/114; 210/115; 210/117; 210/259; 210/416.1

(58) Field of Classification Search
USPC ............ 210/416.4, 114, 115, 117, 259, 416.1
See application file for complete search history.

(56) References Cited

U.S. PATENT DOCUMENTS 4,976,852 A * 12/1990 Janik et al. .................. 210/86
5,958,237 A * 9/1999 Cort et al. .................. 210/416.4

FOREIGN PATENT DOCUMENTS

DE 102004059062 B4 9/2006

OTHER PUBLICATIONS

DPMA Office Action of Aug. 12, 2011 on priority DE102010047354.5-13.

* cited by examiner

*Primary Examiner* — Nam Nguyen
*Assistant Examiner* — Paul J Durand
(74) *Attorney, Agent, or Firm* — James Hasselbeck

(57) ABSTRACT

A fuel filter system having a fuel filter (14) and water separation device (20), a water collecting chamber (24) with a drain line (26, 28) and controllable water discharge valve (30). A cleaning component (32) is disposed in the drain line behind the water discharge valve (30). A suction line (38) connects a fuel tank (40) with the fuel pump (18). Between the water collecting chamber (24) and cleaning component (32) a connecting line (36) branches to suction line (38) having a pressure controlled stop check valve (44).

6 Claims, 2 Drawing Sheets

FUEL SUPPLY SYSTEM OF AN INTERNAL COMBUSTION ENGINE AND METHOD FOR SEPARATING WATER FROM FUEL

CROSS REFERENCE TO RELATED APPLICATIONS

This application claims the benefit under 35 USC 119 of German patent application DE 102010047354.5-13 filed in Germany on Oct. 5, 2010, and which is hereby incorporated by reference in its entirety.

TECHNICAL FIELD

The invention concerns a fuel filter system of a fuel supply system of an internal combustion engine, in particular of a motor vehicle, comprising at least one fuel filter for filtration of fuel serving to operate the internal combustion engine and a water separation device for separating water contained in the fuel that are disposed in a pressure line with which an outlet of a fuel pump is connected with a high-pressure section of the fuel supply system; including a water collecting chamber for receiving the water separated from the fuel which chamber includes a water drain line with a controllable water discharge valve; including a cleaning component for cleaning the separated water that is arranged in the water drain line in drain direction behind the water discharge valve; and including a suction line that connects a fuel tank with an inlet of the fuel pump.

Moreover, the invention concerns a method for separating water from fuel serving to operate an internal combustion engine wherein the fuel is removed from a fuel tank and is passed through a suction line into a water separation device that is arranged in a pressure line and in which the water is first separated from the fuel and passed into a water collecting chamber, wherein the fuel, after the water has been separated, is used for operating an internal combustion engine and the water collected in the water collecting chamber, after a residence time that it has spent within the water collecting chamber, is drained via a water drain line through a cleaning component from the water collecting chamber, wherein with the cleaning component fuel proportions are separated from the water.

BACKGROUND OF THE INVENTION

DE 10 2004 059 062 A1 discloses a fuel filter comprising water separation in which the separated water sinks into a collecting chamber. A sensor detects the water level and delivers a signal for opening a valve whereupon the pump conveys the water into a water discharge device.

A commercially available fuel filter system of an internal combustion engine of a motor vehicle has a suction line that connects a fuel tank with an inlet of a fuel pump. In the suction line there is a prefilter for filtering the conveyed fuel. Moreover, the fuel filter system has a pressure line that connects an outlet of the fuel pump with a high-pressure pump of the fuel supply system. In the pressure line there is a main filter for the fuel and a water separator for separating water contained in the fuel. The water separator is connected with a water collecting chamber in which the water that has been separated is collected. From the water collecting chamber a water drain line passes into the environment. In the water drain line there is a water discharge valve that can be opened for draining the water. Behind the water discharge valve in the water drain line a ceramic cleaning device with a channel structure is arranged. By means of the ceramic cleaning device hydrocarbons which may be contained in the separated water are removed from the water. The thus purified water can be drained into the environment. The separated hydrocarbons remain within the ceramic cleaning device. In order to ensure permanently an efficient separation of hydrocarbons from the water, the ceramic cleaning device must be exchanged regularly. The service life of the ceramic cleaning device is moreover shortened in that residual water with hydrocarbons remaining in a space between the water discharge valve and the ceramic cleaning device causes soiling of the ceramic cleaning device. Under frost, the residual water can freeze and damage the ceramic cleaning device.

The invention has the object to configure a fuel filter system and a method for separating water of the aforementioned kind in which always an efficient water separation from the fuel and an optimal cleaning of the separated water are ensured. Moreover, the cleaning component should have a service life as long as possible.

SUMMARY OF THE INVENTION

This object is solved according to the invention in that a connecting line to the suction line branches off the water drain line between the water collecting chamber and the cleaning component, in which connecting line a bidirectional stop-and-check valve is arranged that is controllable depending at least on the pressure in the water drain line in such a way that it blocks in case that in the water drain line a reduced pressure exists compared to the suction line; that it opens in case that in the water drain line a greater pressure exists compared to the suction line and the pressure difference is smaller than a limit pressure difference; and that it blocks in case that in the water drain line a greater pressure exists compared to the suction line and the pressure difference is at least as great as the limit pressure difference.

According to the invention, a connecting line is thus provided by means of which the residual water contained in the water drain line and contaminated with fuel proportions and the fuel proportions, in particular hydrocarbons, retained at the raw side of the cleaning component can be returned to the suction line and thus to the fuel supply line. In this way, the service life of the cleaning component is significantly extended. Damage of the cleaning component by freezing of residual water is prevented. The bidirectional stop-and-check valve is designed such that, at a pressure in the water drain line that is greater than the pressure in the suction line by less than the limit pressure difference, it will open so that the residual water from the water drain line and the cleaning component is sucked into the suction line. The check valve prevents that when the internal combustion engine is shut down air can pass through the cleaning component, that may be vented by a pure water outlet, into the suction line and thus into the fuel supply line. In this way, the suction line cannot drain empty which could result in starting problems of the internal combustion engine. Moreover, the check valve prevents that during filling of the fuel supply system via the suction line, when in the suction line a pressure exists that is significantly greater than the pressure in the water drain line, fuel can flow through the connecting line into the cleaning component. In case of water drainage when the water discharge valve is opened in order to drain the water from the water collecting chamber through the water drain line into the environment, a fast pressure increase results in the water drain line. This pressure increase is greater than the pressure in the suction line by more than the limit pressure difference. The check valve is automatically closed. In this way, it is prevented that water from the water drain line is pressed into the suction line. The limit pressure difference is smaller than the pressure difference between the pressure in the water drain line and the pressure in the suction line during a water discharge phase in which the water discharge valve is opened. It is greater than the corresponding pressure difference outside of the water discharge phase. The features and advantages of the invention that will be explained in the following in connection with the method according to the invention apply likewise to the fuel filter system according to the invention.

In an advantageous embodiment, in the suction line a prefilter can be arranged. With the prefilter coarse dirt is removed from the fuel before the fuel is supplied to the fuel pump. In this way, the servicing intervals of the fuel pump are extended.

Advantageously, the cleaning component can have a channel structure of ceramic Channel structures of ceramic are optimally suited for separating hydrocarbons from water. The water that is loaded with hydrocarbons is pressed under pressure into the channels. As a result of the pressure within the channels of the ceramic, the smaller water molecules are forced through the ceramic and can be released into the environment. The larger hydrocarbon molecules are retained at the raw side of the ceramic.

In a further advantageous embodiment, the check valve is a double-sealing, in particular spring-loaded, check valve, in particular a ball check valve or a poppet check valve whose direction of passage is oriented from the water drain line to the suction line. A check valve is of a simple configuration. By means of it in a simple and reliable way the flow-through direction in the connecting line is predetermined so that no fuel can pass from the suction line to the connection line. The double-sealing configuration of the check valve enables that it blocks also in the direction of passage when the pressure in the water drain line is greater by more than the limit pressure difference in comparison to the pressure of the suction line. The spring load ensures that the check valve independent of its orientation in space will block in the blocking direction as long as no sufficiently large pressure acting opposite to the spring load is existing in the water drain line.

In an alternative advantageous embodiment, the check valve can be a 2/2 way valve with a first control connector that is connected to the pressure line and a second control connector that is connected to the water drain line. The check valve can thus be controlled in a simple way by pressure differences between the pressure line and the water drain line. Since the 2/2 way valve in contrast to a check valve is actively controlled, a pretension spring that is contained in the 2/2 way valve can be loaded with a greater pretension than a pretension spring of a corresponding check valve.

Advantageously, in a section of the water drain line that is located in the water drain direction in front of the cleaning component and adjoins it, a float can be arranged that, when the water level drops below a predetermined value in the section, seals the water drain line relative to the connecting line. In this way, it is achieved that in the section a certain quantity of residual water remains that is just about sufficient in order to prevent that the cleaning component will dry out.

With regard to the method, the object is further solved in accordance with the invention in that, in the operating phases of the internal combustion engine in which the water is not drained from the water collecting chamber, a bidirectional stop-and-check valve in a connecting line between the water drain line and the suction line is opened because of the pressure in the water drain line that is greater by less than the predetermined limit pressure difference in comparison to the pressure in the suction line and the fuel proportions that have been separated from the water will be conveyed from the cleaning component into the suction line; in operating phases of the internal combustion engine in which the water is drained from the water collecting chamber, the check valve is blocked because of the pressure in the water drain line that is greater by at least the limit pressure difference in comparison to the pressure in the suction line; and in shut-down phases of the internal combustion engine, the check valve is blocked because of the pressure in the water drain line that is smaller or the same as the pressure in the suction line.

According to the invention, at a pressure in the water drain line that is greater by less than the predetermined pressure difference in comparison to the pressure in the suction line, the residual water in the water drain line that is located in front of the cleaning component and is loaded with fuel proportions will be sucked into the suction line. As soon as the water discharge valve is opened in order to drain the water from the water collecting chamber through the cleaning component into the environment, a fast pressure increase occurs in the water drain line. The pressure increase in the water drain line is greater than the limit pressure difference so that the bidirectional stop-and-check valve is closed and no water can flow from the water collecting chamber into the suction line. When the internal combustion engine is inoperative, the check valve is closed so that no air can pass through a vent of the cleaning component and the water drain line into the suction line. The features and advantages listed above in connection with the fuel filter system according to the invention apply likewise to the method according to the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the figures the same components are provided with same reference numerals.

Figure 1:
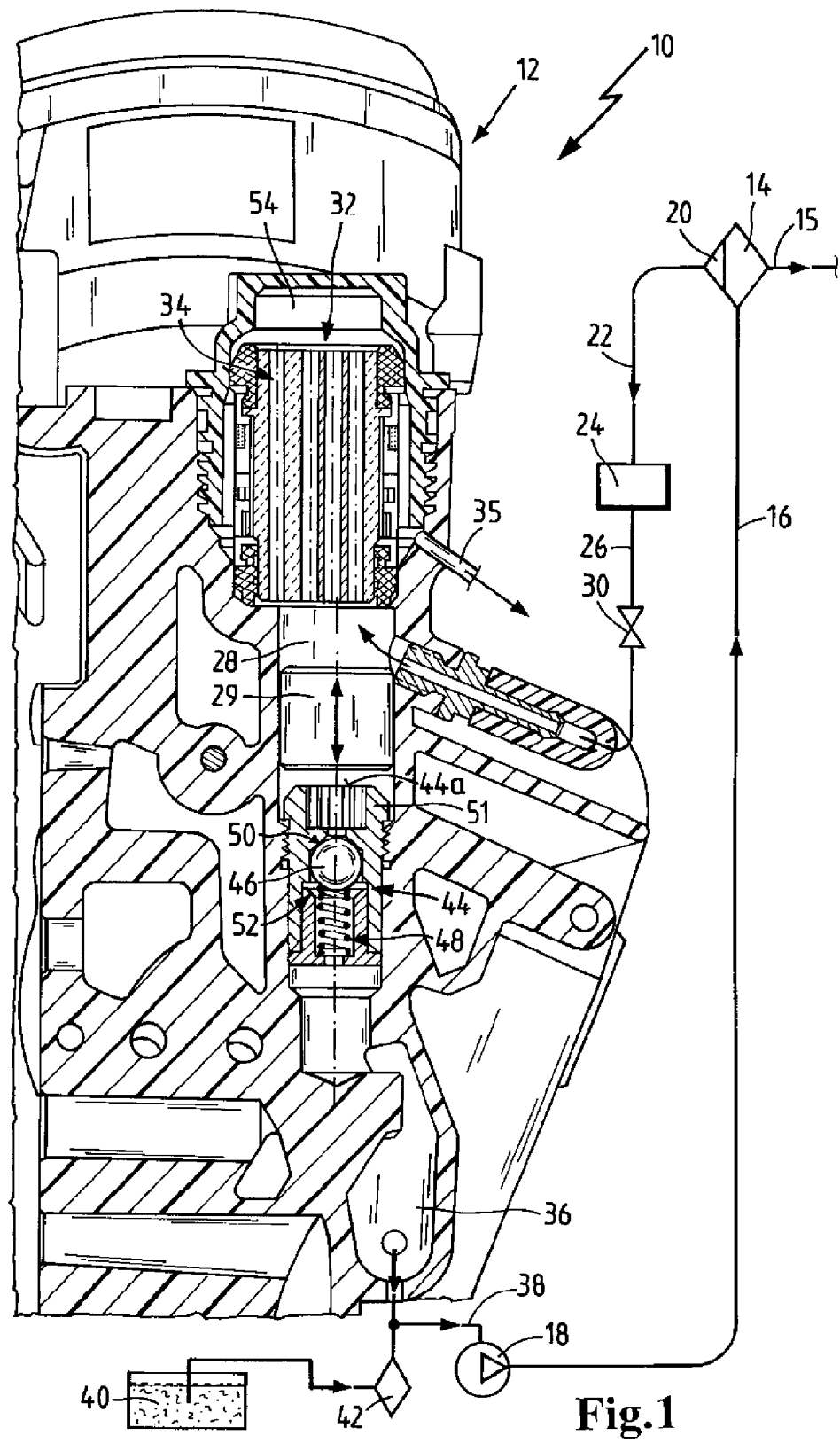
FIG. 1 schematically depicts a fuel filter system of an internal combustion engine of a motor vehicle with a fuel filter molecule that has a water separator, according to a first embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a fuel supply system for an internal combustion engine and a method of separating water from fuel. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1 a fuel filter system 10 is illustrated with a fuel filter module 12 according to a first embodiment. The fuel filter system 10 is located at a low-pressure side of the fuel supply system, not shown otherwise, of an internal combustion engine of a motor vehicle.

The fuel filter system 10 comprises a fuel filter 14 for filtration of a fuel used for operating the internal combustion engine, for example, diesel fuel. A raw side inlet of the main fuel filter 14 is connected by a pressure line 16 with an outlet of a fuel pump 18. The clean-side outlet of the main fuel filter 14 is connected by a high-pressure pump supply line 15 with a high-pressure side of the fuel supply system that is of no consequence here and not illustrated. On the main fuel filter 14 a water separator 20 for separating water contained in the fuel is arranged. The water separator 20 is realized by means of a screen filter. It is also possible to provide a coalescence element for water separation.

A first water drain line 22 extends from the water separator 20 to a water collecting chamber 24. In the water collecting chamber 24 the water that has been separated by the water separator 20 is first collected. From the water collecting chamber 24 a second water drain line 26 extends into the fuel filter module 12. In the fuel filter module 12 an end section of the second water drain line 26 is realized as a cleaning antechamber 28. In the second water drain line 26, in flow direction in front of the cleaning antechamber 28, an electromagnetically actuated water discharge valve 30 is arranged with which it can be opened and closed.

The cleaning antechamber 28 is connected to an inlet side of a ceramic cleaning device 32 which is located spatially above the cleaning antechamber 28. In the ceramic cleaning device 32 fuel proportions, for example hydrocarbons, that are still contained in the separated water are separated. The ceramic cleaning device 32 is provided for this purpose with a plurality of interior channels 34 into which the contaminated water flows under pressure. The water is forced through the walls of the interior channels 34 and passes into a clean water discharge passage 35. Through the clean water discharge passage 35 the purified water can be released into the environment. The separated hydrocarbons remain in the ceramic cleaning device 32.

On the side of the ceramic cleaning device 32 that is opposite the cleaning antechamber 28 there is a pressure storage chamber 54. The pressure storage chamber 54 contains an air bubble that is compressed upon drainage of the purified water into the environment. In case of emptying the ceramic cleaning device 32 and the cleaning antechamber 28, to be described below, the air bubble will expand and thus support the sucking action on the residual water.

The cleaning antechamber 28 is moreover connected by means of connecting line 36 with a suction line 38 of the fuel filter system 10. The suction line 38 connects a fuel tank 40 with an inlet of the fuel pump 18. In the suction line 38 there is a prefilter 42 with which the fuel from the fuel tank 40 is prefiltered before it is supplied to the fuel pump 18. The connecting line 36 opens between prefilter 42 and the fuel pump 18 into the suction line 38. By means of the connecting line 36, the residual water contained in the cleaning antechamber 28 and loaded with hydrocarbons as well as the hydrocarbons separated by the ceramic cleaning device 32 can be removed by suction into the suction line 38.

In the connecting line 36 there is a bidirectional stop-and-check valve 44 in the form of a ball check valve. The check valve 44 is located spatially below the cleaning antechamber 28. It determines the flow-through direction from the cleaning antechamber 28 through the connecting line 36 to the suction line 38. Bidirectional in the meaning of the invention means that the check valve 44 is suitable to block in both flow directions, i.e., in the blocking direction and in the direction of passage of the ball check valve.

The check valve 44 comprises a ball 46 of rubber which by means of a pretension spring 48 in the rest state rests seal-tightly against a first sealing surface 50. The first sealing surface 50 is located on the side of a valve housing 51 that is facing the cleaning antechamber 28. On the side that is opposite the first sealing surface 50 the check valve 44 has a second sealing surface 52 for the ball 46. The ball 46 can move in the valve housing 51 back and forth between the two sealing surfaces 50 and 52. It can rest seal-tightly against the first sealing surface 50 or the second sealing surface 52. For opening the check valve 44, the ball 46 can also assume a position between the two sealing surfaces 50 and 52 so that between the ball 46 and each of the two sealing surfaces 50 and 52 a radial gap remains, respectively, through which water may flow.

In the cleaning antechamber 28 a float 29 is arranged that can be moved toward and away from an inlet opening 44a of the check valve 44 provided thereat. As soon as the water level of the residual water in the cleaning antechamber 28 drops below a predetermined minimum level, the float 29 is seal-tightly resting against the inlet opening 44a of the check valve 44. In this way, it is prevented that leakage air can be sucked into the fuel supply system which could lead to cavitation in the fuel pump and thus to its destruction.

The fuel filter system 10 functions as follows.

When the internal combustion engine is running, fuel is sucked by means of the fuel pump 18 from the fuel tank 40 through the suction line 38 and through the prefilter 42. The sucked-in fuel is pumped through pressure line 16 through the main fuel filter 14 to the high-pressure pump supply line 15 and from there to the high-pressure side of the fuel supply system that is not show.

In the main fuel filter 14 the fuel is purified. With the water separator 20 the water contained in the fuel is separated. The separated water contaminated with hydrocarbons is supplied through the first water drain line 22 to the water collecting chamber 24 and is collected therein.

A water sensor, not of interest in this connection, that is combined with the water discharge valve 30 detects the water level in the water collecting chamber 24. As soon as a predetermined water level has been reached, a signal is transmitted to a motor control unit, not of interest in this connection and not shown, which opens the water discharge valve 30. The contaminated water from the water collecting chamber 24 is supplied through the second water drain line 26 to the cleaning antechamber 28. From here it is pressed into the interior channels 34 of the ceramic cleaning device 32. In the main fuel filter 14 overpressure exists of approximately 6 to 7 bar that during the water discharge phase determines the pressure in the cleaning antechamber 28 and in the second water drain line 26. With this overpressure the water is forced into the ceramic cleaning device 32. The air bubble in the pressure storage chamber 54 is compressed in this way. The water is pressed through the walls of the interior channels 34 into the clean water discharge passage 35 and from there is drained into the environment. Hydrocarbons contained in the water remain within the ceramic cleaning device 32.

In the connecting line 36, at the side of the check valve 44 that is facing the suction line 38, underpressure of approximately 300 mbar exists during the water discharge phase. The pressure difference between the pressure in the cleaning antechamber 28 and the pressure in the suction line 38 is greater than a predetermined limit pressure difference. The limit pressure difference is predetermined by the closing pressure of the ball 46 relative the first sealing surface 50 that is approximately 450 mbar. The ball 46 is pressed against the first sealing surface 15 and in this way the check valve 44 is blocked in the direction of passage. No clean water can pass from the cleaning antechamber 28 through the connecting line 36 into the suction line 38.

As soon as the water sensor detects a satisfactory emptying of the water collecting chamber 24, it transmits an appropriate signal to the motor control unit which then controls the water discharge valve 30 so as to close it and terminates in this way the water discharge phase.

When the internal combustion engine is running and the water discharge valve 30 is closed, i.e., outside of the water discharge phase, in the cleaning antechamber 28 an underpressure of approximately 180 to 500 mbar exists. As long as the pressure in the collecting line 36 on the side of the check valve 44 that is facing the suction line 38, plus the pretension of the spring 48, is greater than the pressure in the cleaning antechamber 28, the check valve 44 closes in its blocking direction so that no fuel from the suction line 38 can reach the cleaning antechamber 28.

At higher engine speeds of the internal combustion engine, the underpressure in the suction line 38 increases so that the pressure in the connecting line 36 at the side of the check valve 44 that is facing the suction line 38 decreases relative to the pressure in the cleaning antechamber 28. The ball 46 is lifted against the pretension of the spring 48 off the first sealing surface 50 so that thereat the first gap is formed. The opening pressure of the check valve 44 upon contact of the ball 46 on the first sealing surface 50 is approximately between 270 mbar and 350 mbar. As long as the pressure difference between the pressure of the side of the connecting line 36 facing the suction line 38 and the pressure in the cleaning antechamber 28 is smaller than the limit pressure difference, the second gap between the ball 46 and the second sealing surface 52 remains also. The check valve 44 is open in its direction of passage. The residual water in the cleaning antechamber 28 and the hydrocarbons separated in the ceramic cleaning device 32 are sucked away through the connecting line 36 to the suction line 38 and are returned into the fuel supply line. First the air bubble in the pressure storage chamber 54 is forced through the porous structure of the ceramic cleaning device 32 as long as in the cleaning antechamber 28 a higher pressure exists in comparison to the side of the connecting line 36 that is facing the suction line 38 before the hydrocarbons are sucked away.

Upon reaching the minimum level in the cleaning antechamber 28, the float 29 seals the cleaning antechamber 28 relative to the check valve 44 and thus stops the further suction action on the residual water.

The second gap and the pretension of the spring 48 are dimensioned such that the residual water can be sucked away from the cleaning antechamber 28 through the connecting line 36. However, when a pressure pulse happens, for example, upon starting the water discharge phase, when the pressure in the cleaning antechamber 28 is increased by at least the limit pressure difference in comparison to the pressure in the suction line 38, the ball 46 is seal-tightly pressed against the second sealing surface 52 so that the check valve 44 blocks in its direction of passage.

When the internal combustion engine is not in operation, the pressure in the cleaning antechamber 28 is smaller or identical to the pressure in the suction line 38. The underpressure in the suction line 38, for a fuel column of maximally 2 meters, is approximately 180 mbar. The ball 46 is positioned as a result of pretension of the spring 48 seal-tightly against the first sealing surface 50 so that the check valve 44 is closed in the blocking direction. In this way, it is prevented that air passes through the clean water discharge passage 35, through the porous structure of the ceramic cleaning device 32, and the connecting line 36 into the suction line 38 to thereby reach the fuel supply line. The suction line 38 could empty because of the air supply which causes starting problems of the internal combustion engine.

During a filling process of the fuel supply system through the prefilter 42 in the suction line 38 an over pressure of approximately 6 to 7 bar exists. The check valve 44 blocks in the blocking direction and prevents thus that fuel from the suction line 38 will pass through the cleaning antechamber 28 into the ceramic cleaning device 32.

Figure 2:
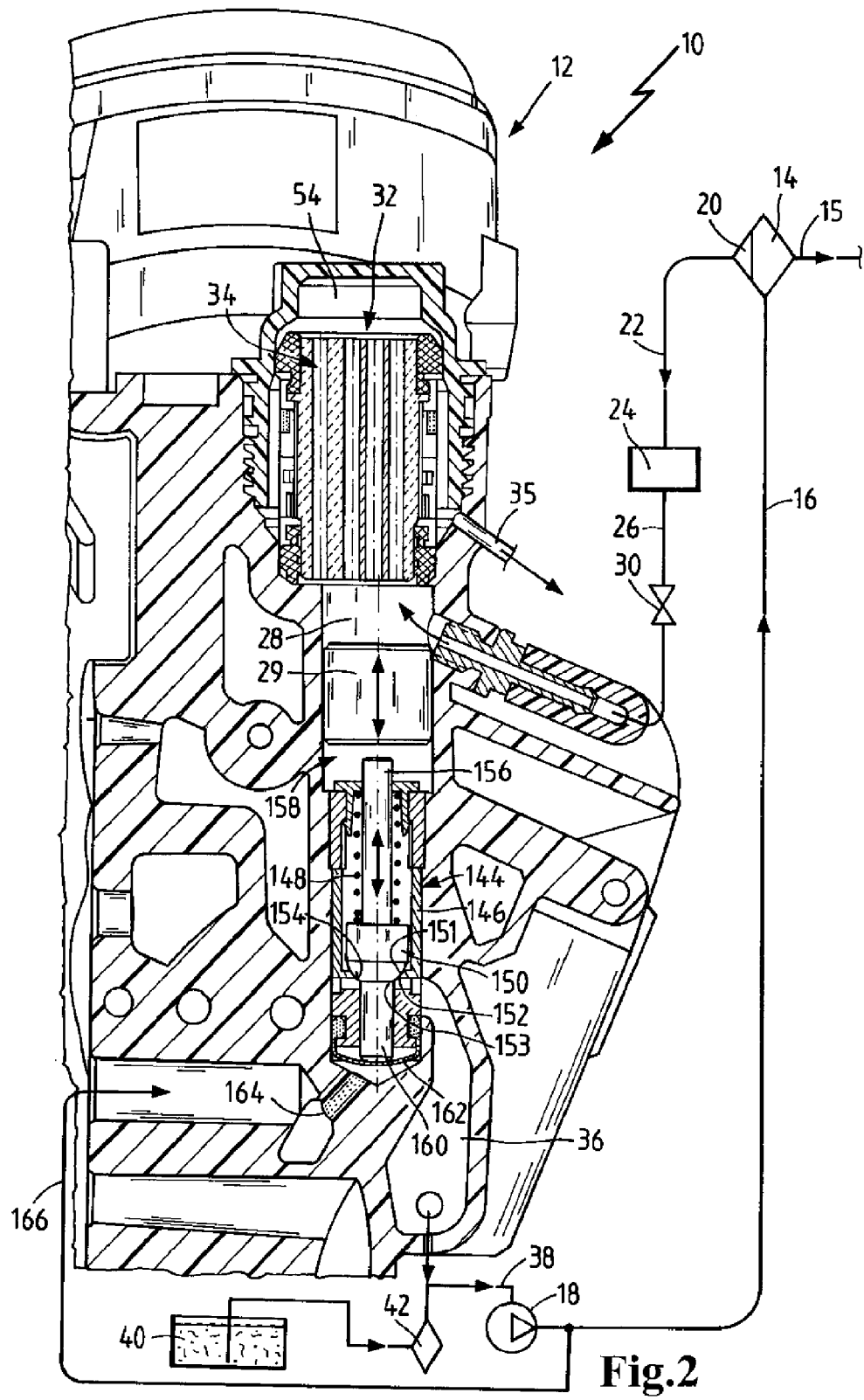
FIG. 2 schematically depicts a fuel filter system according to a second embodiment that is similar to the fuel filter system of FIG. 1.

In a second embodiment, illustrated in FIG. 2, those elements that are similar to those of the first embodiment illustrated in FIG. 1 are provided with the same reference numerals so that, with respect to their description, reference is being had to the description of the first embodiment. The instant embodiment differs from the first in that instead of the check valve 44 a check valve in the form of a 2/2 way valve 144 is used.

The 2/2 way valve 144 has a valve housing 146 in which a valve piston 150 is arranged to be slidable in axial direction. A pre-tensioned valve spring 148 in the form of a spiral pressure spring forces in the rest state of the 2/2 way valve 144 a piston sealing surface 154 provided on a sealing collar 151 of the valve piston 150 seal-tightly against a sealing surface 152 of the valve housing 146. The sealing surface 152 surrounds a passage 153 that connects the interior of the valve housing 146 with the connecting line 36. The 2/2 way valve 144 blocks in the rest state in both directions so that neither fuel from the connecting line 36 can pass into the cleaning antechamber 28 and the ceramic cleaning device 32 nor can water or air pass from the cleaning antechamber 28 through the connecting line 36 into the suction line 38.

A first plunger 156 on the side of the valve piston 150 facing the cleaning antechamber 28 is loaded with the pressure that is existing in the cleaning antechamber 28. The float 29 does not seal relative to the housing so that the float 29 does not effect a pressure change between the cleaning antechamber 28 and the first plunger 156. When in the cleaning antechamber 28 a greater pressure exists than in the pressure line 166, which will be explained in more detailed father below, by means of the first plunger 156 the sealing collar 151 of the valve piston 150 is pressed with increased force against the sealing surface 152. The inlet of the 2/2 way valve 144 to the cleaning antechamber 28 acts in this way additionally as a first control connector 158 of the 2/2 way valve 144.

A second plunger 160 of the valve piston 150 that extends coaxially to the first plunger 156 on the side of the sealing collar 151 opposite the first plunger 156 is resting with its end that is facing away from the valve piston 150 on a sealing diaphragm 162. The sealing diaphragm 162 seals the interior of the valve housing 146 relative to a second control connector 164. The second control connector 164 is connected by a control line 166 with the pressure line 16. By means of the sealing diaphragm 162 the pressure in the pressure line 16 and thus in the control line 166 is transmitted onto the second plunger 160. In case the pressure in the pressure line 16 is greater than the pressure in the cleaning antechamber 28, the valve piston 150 is moved by means of the sealing diaphragm 162 against the pretension of the valve spring 148 away from the piston sealing surface 152. In this connection, the piston sealing surface 152 is lifted off the sealing surface 154 of the sealing collar 151. The 2/2 way valve 144 is then in the open state.

The 2/2 way valve 144, as will be explained in the following, is controlled as a whole by the pressures that are existing in the pressure line 16 and in the second water drain line 26, i.e., in the cleaning antechamber 28.

As soon as the internal combustion engine is started, with closed water discharge valve 30, the pressure in the pressure line 16 will increase and thus also the pressure in the control line 166 and in the second control connector 164. In the valve housing 146 the valve piston 150 is moved away from the sealing surface 152 and the 2/2 way valve 144 opens. The residual water of the cleaning antechamber 26 and the separated hydrocarbons in the ceramic cleaning device 32 are then sucked away through the first passage 153 into the connecting line 36 and from there into the suction line 38.

As soon as the water discharge valve 30 opens in order to drain the separated water from the water collecting chamber 24 and the second water drain line 26, in the cleaning antechamber 28 and in the ceramic cleaning device 32 suddenly an increased pressure is generated. This increased pressure is supplied to the first control connector 158 of the 2/2 way valve 144 and counteracts the pressure in the control line 166. The pressure conditions at the valve piston 150 are compensated. The pretension of the valve spring 148 has the effect that the valve piston 150 is pressed against the first sealing surface 152 and the 2/2 way valve 144 is closed in the direction toward the connecting line 36. In this way it is prevented that during the water discharge phase, during which a limit pressure difference between the pressure in the water drain line 36 and the pressure in the suction line 38 is surpassed, water can pass from the cleaning antechamber 28 into the suction line 38. The limit pressure difference is predetermined such that it is smaller than the pressure difference between the pressure in the water drain line 26 and the pressure in the suction line 38 during the water discharge phase. It is greater than the corresponding pressure difference outside of the water discharge phase.

When the internal combustion engine is inoperative, the 2/2 way valve 144 is switched by the pretension of the valve spring 148 so as to block so that no air can pass into the suction line 38 through the clean water discharge passage 35 via the ceramic cleaning device 32, the cleaning antechamber 28 and the connecting line 36.

Since the 2/2 way valve 144 is actively controlled, the valve spring 148 can be correspondingly pretensioned strongly so that a great closing force is accordingly provided.

In all of the above described embodiments of a fuel filter system 10 and a method for separating water from fuel, the following modifications are possible inter alia.

The invention is not limited to fuel filter systems 10 of motor vehicles. Instead, it can also be used in internal combustion engines of a different kind, for example, in industrial motors.

The check valve 44, instead of being a ball check valve, can also be a check valve of a different kind, for example, a poppet check valve with a poppet instead of the ball 46.

Instead of the check valve 44 or of the 2/2 way valve 144, a different kind of bidirectional stop-and-check valve can be provided also.

A float 29 is not necessary in case a complete drainage of the cleaning antechamber 28 is not important or is not desired at all.

Instead of the ceramic cleaning device 32 also a different cleaning component for cleaning the water that has been separated can be provided.

The fuel filter module 12 can also be used in a fuel filter system 10 in which no prefilter 42 exists.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fuel filter system (10) of a fuel supply system of an internal combustion engine comprising:
   a fuel pump (18) delivering fuel to the internal combustion engine;
   at least one fuel filter (14) filtering fuel serving to operate the internal combustion engine;
   a pressure line (16) connecting an outlet of said fuel pump (18) to said at least one fuel filter (14) and a high pressure section (15) of said fuel supply system;
   a water separation device (20) separating water from the fuel delivered in said pressure line (16);
   a water collecting chamber (24) connected by a drain line (22) to said water separation device (20) to receive the water separated from the fuel;
   a controllable water discharge valve (30) arranged in a second water drain line (26) and operative to open or close said second drain line (26) to flow, said second drain line interconnecting said water collecting chamber (24) to said water discharge valve (30);
   a cleaning component (32) operative to clean said separated water of hydrocarbons, said cleaning component (32) arranged in said second water drain line (26,28) downstream of said water discharge valve (30);

a suction line (38) connecting and delivering fuel from a fuel tank (40) to an inlet of said fuel pump (18);

wherein a bidirectional stop-and-check valve (44; 144) is arranged in a connecting line (36) that interconnects said suction line (38) and said second water drain line (26) at a portion (28) of said second water drain line (26) between said water collecting chamber (24) and said cleaning component (32);

wherein said bidirectional stop-and-check valve (44; 144) is operative, at least depending on the pressure in the second water drain line (26), to block flow between said second water drain line (26) and said suction line (38) when a pressure in said second water drain line (26) is less than pressure in said suction line (38);

wherein said bidirectional stop-and-check valve (44; 144) is operative to open permitting flow between said second water drain line (26) and said suction line (38) when a pressure in said second water drain line (26) is greater than pressure in said suction line (38) and pressure difference is smaller than a limit pressure difference;

wherein said bidirectional stop-and-check valve (44; 144) is operative to block flow between said second water drain line (26) and said suction line (38) when a pressure in said second water drain line (26) is greater than pressure in said suction line (38) and pressure difference is at least as great as said limit pressure difference.

2. The fuel filter system according to claim 1, wherein
a prefilter (42) is arranged in said suction line (38) between said fuel tank (40) and said fuel pump (18).

3. The fuel filter system according to claim 1, wherein
said cleaning component (32) comprises a channel structure (34) of ceramic.

4. The fuel filter system according to claim 1, wherein
said bidirectional stop-and-check valve (44; 144) is a double-sealing spring-loaded check valve;

wherein said bidirectional stop-and-check valve has a direction of passage oriented from said second water drain line (26) to said suction line (38), said bidirectional stop-and-check valve embodied as a ball check valve (44) or a poppet check valve.

5. The fuel filter system according to claim 1, wherein
said bidirectional stop-and-check valve (44; 144) comprises a first control connector (164) that is connected with said pressure line (116, 16); and wherein bidirectional stop-and-check valve (44; 144) comprises a second control connector (158) that is connected with said water drain line (26).

6. The fuel filter system according to claim 1, wherein
in a section (28) of the second water drain line (26) that is positioned in the drain direction of the water in front of the cleaning component (32) and adjoins it, a float (29) is arranged which when a water level in the section (28) drops below a predetermined value, seals off said second water drain line (26) relative to said connecting line (36).

\* \* \* \* \*